United States Patent [19]

Kuhn

[11] Patent Number: 5,191,756
[45] Date of Patent: Mar. 9, 1993

[54] MULCHING MOWER APPARATUS
[75] Inventor: John B. Kuhn, Rubicon, Wis.
[73] Assignee: Deere & Company, Moline, Ill.
[21] Appl. No.: 829,639
[22] Filed: Feb. 3, 1992

Related U.S. Application Data

[63] Continuation-in-part of Ser. No. 651,851, Feb. 4, 1991, abandoned.

[51] Int. Cl.$^5$ ............................................. A01D 55/18
[52] U.S. Cl. ........................................ 56/17.5; 56/13.4
[58] Field of Search ........................ 56/17.5, 13.4, 255

[56] References Cited

U.S. PATENT DOCUMENTS

| | | | |
|---|---|---|---|
| 2,836,024 | 5/1958 | Davis | 56/17.5 X |
| 3,608,291 | 9/1971 | Kidd | 56/17.5 X |
| 3,797,212 | 3/1974 | Pursel | 56/255 |
| 4,189,903 | 2/1980 | Jackson et al. | 56/17.5 X |
| 4,189,904 | 2/1980 | Paker | 56/255 |
| 4,205,512 | 6/1980 | Thorud | 56/13.4 X |
| 4,312,174 | 1/1982 | Vanderhoef | 56/320.2 |
| 4,318,268 | 3/1982 | Szymanis | 56/255 |
| 4,864,808 | 9/1989 | Weber | 56/320.2 |
| 4,890,446 | 1/1990 | Israel | 56/17.5 |
| 4,951,449 | 8/1990 | Thorud | 56/17.5 X |

FOREIGN PATENT DOCUMENTS

| | | |
|---|---|---|
| 1482005 | 1/1969 | Fed. Rep. of Germany . |
| 2624983 | 12/1976 | Fed. Rep. of Germany . |
| 3542276 | 6/1986 | Fed. Rep. of Germany . |
| 1584495 | 2/1981 | United Kingdom . |

Primary Examiner—Thuy M. Bui

[57] ABSTRACT

A mulching mower apparatus for use in a mover having a housing that includes a discharge outlet. A guide mechanism is provided for guiding air and vegetation clippings radially inwardly and downwardly towards the blade for re-cutting, and a blocking mechanism is provided for partially blocking the housings discharge outlet to thereby allow a portion of the air circulating within the housing to escape and increase the lifting of the vegetation to be cut.

35 Claims, 6 Drawing Sheets

MULCHING MOWER APPARATUS

CROSS-REFERENCE TO RELATED APPLICATIONS

This application is a Continuation-In-Part of application Ser. No. 07/651,851, filed Feb. 4, 1991, now abandoned.

BACKGROUND OF THE INVENTION

1. Field of the Invention

The invention relates to mechanisms for mulching vegetation such as grass as it is being mowed.

2. Description of the Related Art

Conventional mowers typically include a mower housing or deck for enclosing a rotating cutter blade. Discharge chutes have been provided in these conventional housings for allowing grass clippings to be ejected from the housing. The outlet also allows air to be discharged from the housing, thereby allowing the rotating blade to create a vacuum effect that lifts the grass within the housing so that it can be cut properly and evenly. The clippings ejected from the discharge outlet are then blown on top of the mowed grass, or collected by use of a bagging attachment coupled to the discharge outlet. However, it may be desirable to mulch or chop the grass clippings into fine particles and direct these clippings downwardly into the growing grass. This allows the grass clippings to be hidden beneath the top surface of a lawn. In addition, this allows the grass clippings to decompose on the soil where they are of nutritional value to growing vegetation.

In an attempt to meet the need for a mulching mower, mechanisms have been provided that entirely enclose the discharge outlet of the mower housing. The grass clippings are thereby prevented from exiting the housing and are re-cut by the mower blade. However, since these mowers totally block the discharge of air through the outlet, the circulation of air is reduced. Therefore, the vacuum effect is reduced when the discharge is blocked, and the grass is not lifted properly for cutting by the blade.

Also, many prior art mulching mowers having enclosed discharge outlets tend to plug up with grass clippings during mowing operations in heavy or long vegetation. Since there is no outlet for the clippings, they build up within the housing. The clippings tend to wad together and fall out of the housing in unsightly clumps when heavy or long grass is mowed. These mowers tend to deposit grass along the sides of the housing, thereby creating an unsightly "windrowing" of clippings. Also, the relatively small vacuum effect created by the blade in a housing having an enclosed discharge outlet results in a low quality of cut during operation in heavy or long grass.

Other prior art mulching mechanisms provide a plate for covering the discharge outlet of the mower deck, and have slots or other openings formed therein. The slots are provided for allowing air to exit the housing to enhance the vacuum effect within the housing while blocking clippings from exiting the housing. However, prior art mulch plates tend to quickly clog with grass clippings during operation, and therefore tend to act as a solid plate that totally covers the outlet. Therefore, slotted mulch plates that quickly become clogged with clippings have disadvantages similar to those associated with mower decks having totally enclosed outlets.

Other prior art mulching mechanisms provide deflectors and/or plates within the housing for deflecting the clippings forwardly, downwardly and/or inwardly toward the center support for the blade. However, these mechanisms may not provide an assured direction to the deflected grass, and may not therefore always move the clippings into the blade for re-cutting. Typically, prior art mowers having deflector surfaces also have enclosed discharge openings and may therefore create the aforementioned problems of clogging, clumping and windrowing associated with totally blocked discharge openings.

Therefore, it would be desirable to provide a mulching mower that channels a large portion of the circulating air which carries the grass clippings inwardly and downwardly toward the mower blade. It would be desirable for such a mower to maintain an enhanced lifting effect on the uncut grass. It would also be desirable to provide such a mower with an overflow feature such that operation in areas of dense vegetation does not cause the housing to become clogged with clippings, or clippings to be deposited on the ground in clumps or windrows.

SUMMARY OF THE INVENTION

The preferred embodiment of the present invention provides a guide means for guiding vegetation clippings radially inwardly and downwardly toward the blade for re-cutting of the clippings. The guide means of the preferred embodiment includes a ramp means for channeling the air and clippings downwardly and a slide member for channeling the air and clippings inwardly. Blocking means is provided by the preferred embodiment for partially covering the discharge outlet. The blocking means includes a plate member and adjustable member that extend downwardly over the top portion of the discharge outlet. The blocking means allows a portion of the air circulating within the housing to pass through the discharge outlet to thereby create a relatively large vacuum effect for lifting the vegetation to be cut. During operation in heavy or long vegetation a portion of the clippings can flow beneath the slide member and toward the discharge outlet such that an overload function is provided. Clogging of the housing and windrowing of clippings during operation in dense vegetation is therefore reduced.

DESCRIPTION OF THE PREFERRED EMBODIMENT

Figure 1:
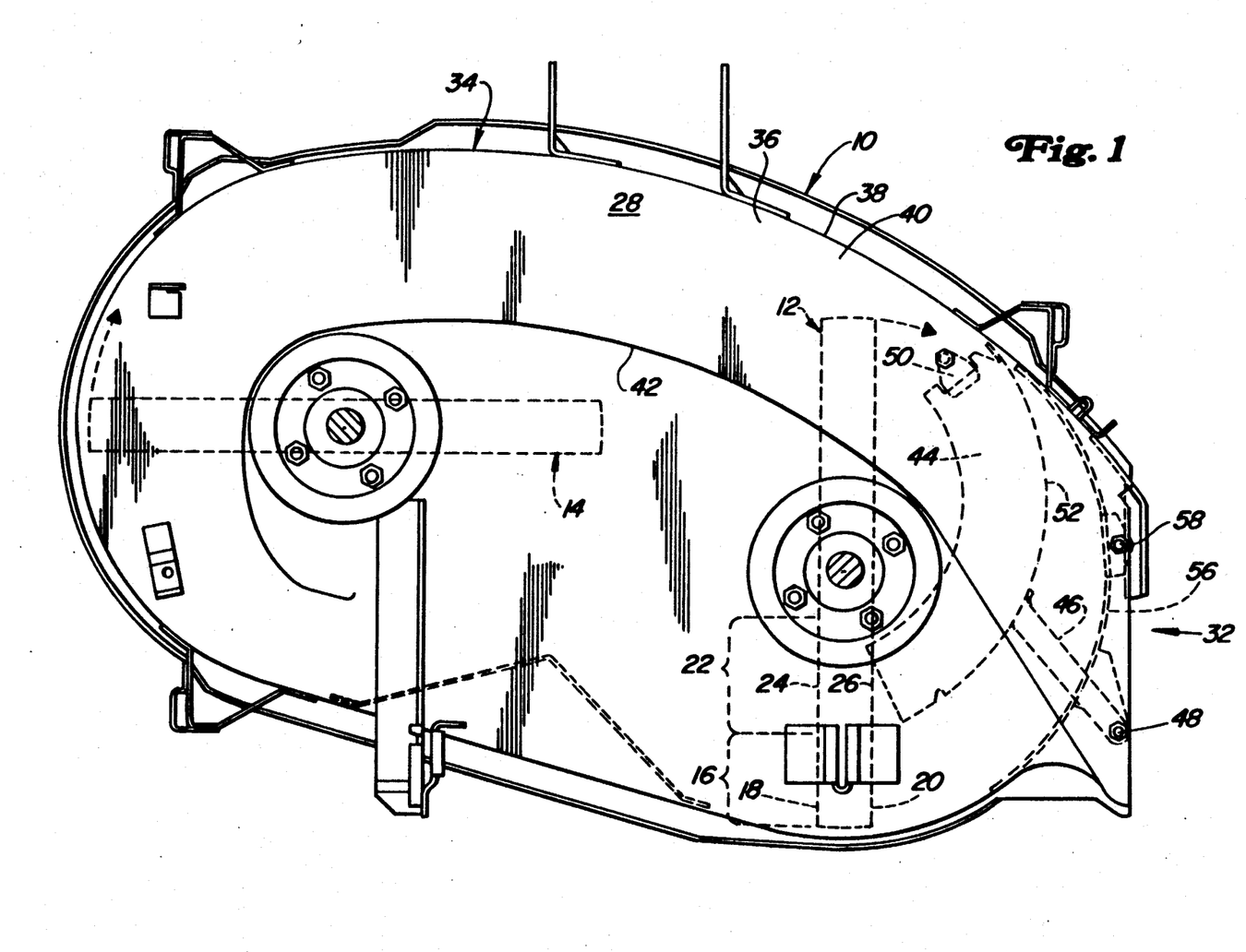
FIG. 1 is a plan view of a mower deck housing including the preferred embodiment of the present invention.
Figure 2:
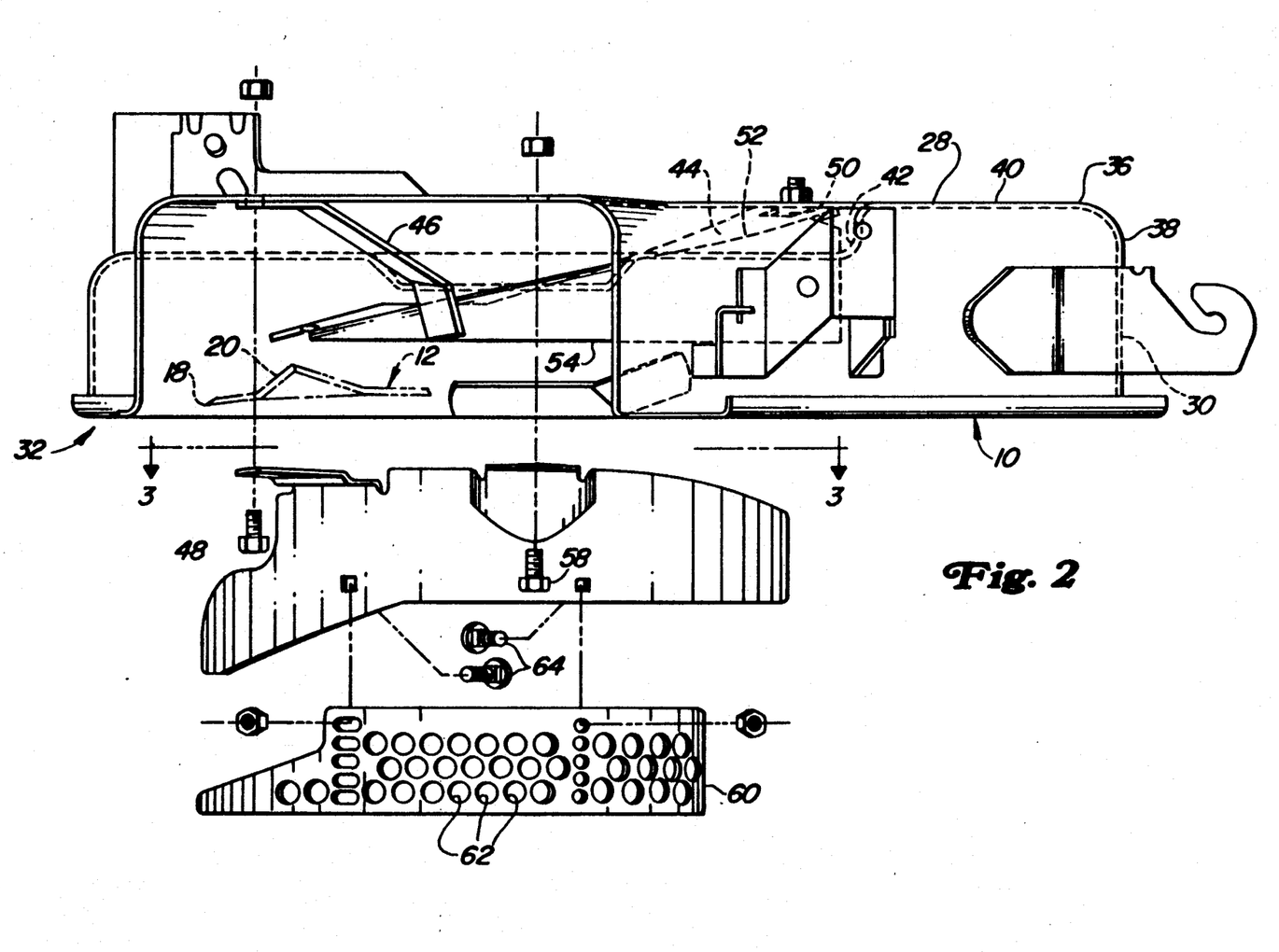
FIG. 2 is a partially exploded side view of the preferred embodiment of the present invention.
Figure 3:
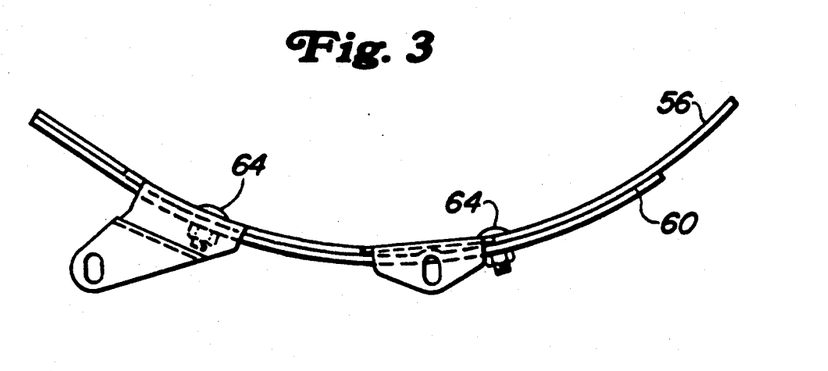
FIG. 3 is a plan view of the plate member and adjustable member according to the preferred embodiment as viewed from section line 3—3 of FIG. 2.
Figure 4:
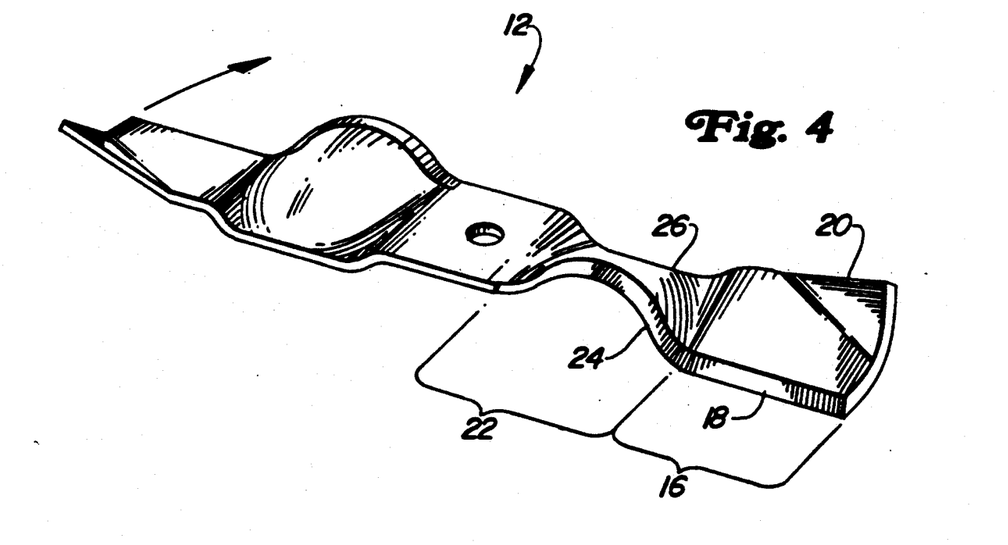
FIG. 4 is a perspective view of a mulching blade for use with the preferred embodiment of the present invention.

Referring now to FIGS. 1-7, there is shown the preferred embodiment of the present invention. A mower deck housing 10 is shown in FIG. 1 as used with the preferred embodiment of the present invention. The housing 10 may be coupled to the front or underside of a vehicle (not shown) such as a lawn and garden tractor for mowing an area of grass or vegetation. A power source (not shown) such as an engine carried by the vehicle rotatably drives cutter blades 12, 14 in a generally horizontal plane and in a clockwise direction as shown in FIG. 1. As best shown in FIG. 4, the blades 12, 14 have a conventional end portion 16 having a leading cutting edge 18 and a trailing upturned wing portion 20 for creating an up-draft. The blades 12, 14 also include an inner portion 22 having a leading cutting edge 24 and a trailing downturned wing portion 26 for creating a down-draft. The housing 10 includes a generally horizontally extending top wall 28 and a vertical side wall 30 for enclosing the cutter blades 12, 14. A discharge outlet 32 is provided in the side of the housing 10 for allowing air and grass clippings to be ejected sidewardly from the housing 10 during operation. A chute 34 is formed in the front portion 36 of the housing 10 to channel the flow of air and clippings from left to right within the housing 10 and out the discharge outlet 32. The chute 34 is defined by the front vertical side wall 38 of the housing 10, a front portion 40 of the housing's top wall 28 and a vertical chute wall 42 formed integral with the housing's top wall 28.

Means is provided in the preferred embodiment for guiding or directing clippings downwardly within the housing 10 and toward the blade 14. A ramp means 44 slopes downwardly in the direction of blade rotation and is coupled to the housing 10 for deflecting air and clippings downwardly toward the blade 14. An arm member 46 extends outwardly from the ramp means 44 for securing the ramp means 44 to the housing 10 via a bolt 48. A clip 50 bolted to the housing 10 acts to secure the front portion of the ramp means 44 against the top wall 28 of the housing 10.

Figures 5, 6, 7:
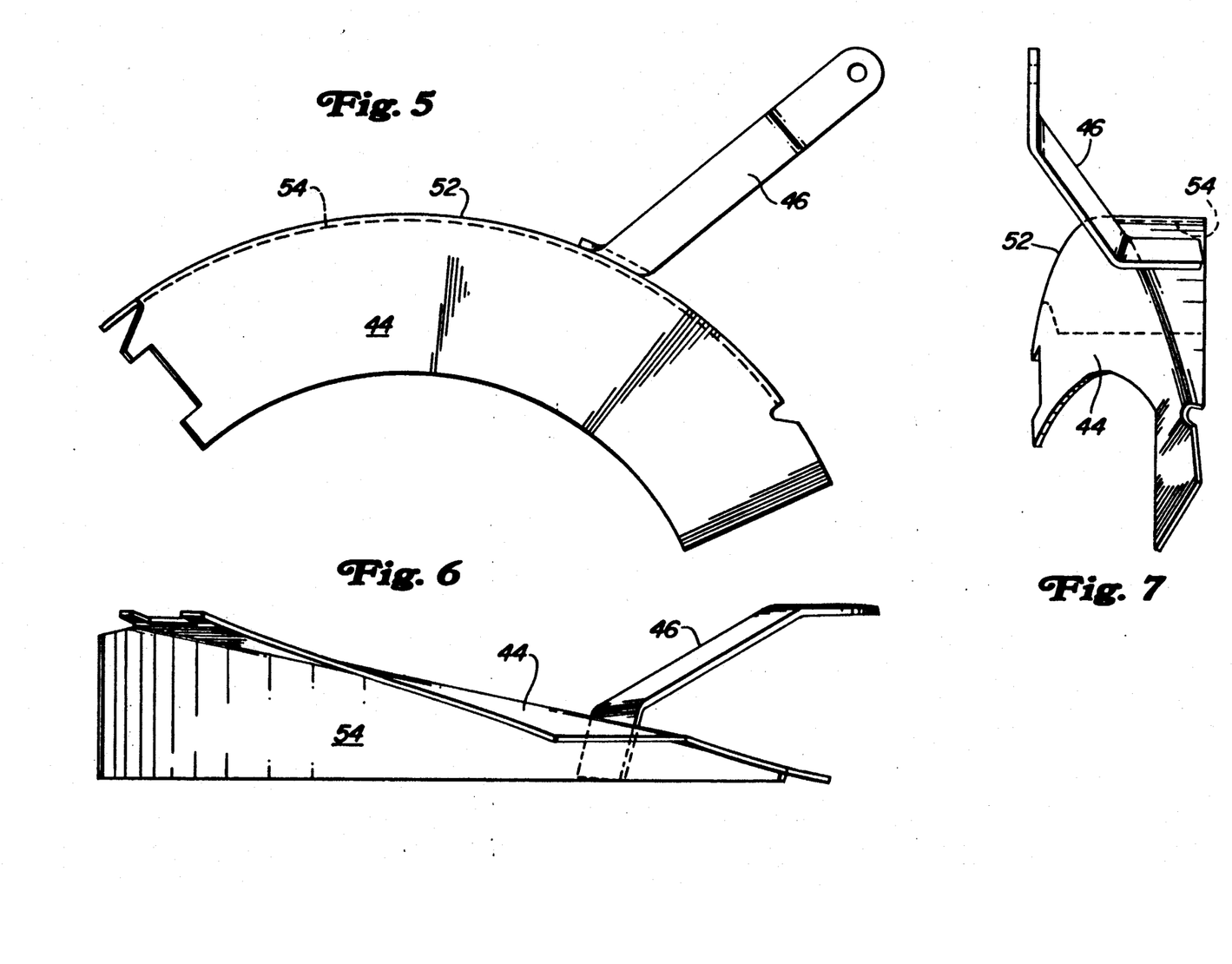
FIG. 5 is a plan view of the ramp means, arm member, and slide member according to the preferred embodiment of the present invention.
FIG. 6 is a side view of the ramp means, arm member and slide member as viewed from the left side of the housing as shown in FIG. 1.
FIG. 7 is a side view of the ramp means, arm member and slide member as viewed from the rear of the housing shown in FIG. 1.

Means is provided for guiding or directing clippings radially inwardly toward the axis of rotation of the blade 14. The ramp means 44 includes an outer radial edge portion 52. A slide member 54 extends vertically downwardly from the outer radial edge portion 52 of the ramp means 44. The slide member 54 acts to channel or guide air and clippings away from the discharge outlet 32 and inwardly toward the inner portion 22 of the blade 14 where the clippings can be re-cut by the inner portions leading cutting edge 24 and blown downwardly by the trailing downturned wing portion 26.

A blocking means is provided for partially closing the discharge outlet 32. A plate member 56 is coupled via bolts 48, 58 to the housing 10 and extends downwardly to cover a portion of the discharge outlet 32. The preferred embodiment provides an adjustable member 60 having a plurality of openings 62 formed therein that is adjustably coupled to the plate member 56 via attachment bolts 64. The adjustable member 60 can be adjusted vertically to vary the restriction of the outlet 32 to accommodate different operating conditions.

Next, the assembly of the preferred embodiment will be discussed. Once the clip 50 has been fixed in place the ramp means 44 may be inserted beneath the housing 10. An operator can slide the ramp means 44 into the discharge outlet 32 and position the ramp means 44 within and against the clip 50, which has been previously mounted to the top wall 28 of the housing 10, without having to remove the housing 10 from the vehicle. The operator can then bolt the plate member 56 to the housing 10 while using one of the attachment bolts 48 to also secure the arm member 46 to the housing 10.

Next, the operation of the preferred embodiment will be discussed. When mowing an area of grass with the mulching attachment according to the present invention installed, the blades 12, 14 rotate clockwise within the housing 10, as shown in FIG. 1. The leading cutting edge 18 on the end portion 16 of the blades 12, 14 will cut grass as the housing 10 moves forwardly, and the upturned wing portion 20 will act to force air and clippings upwardly within the housing 10. Clippings cut by the left blade 12 flow to the right within the chute 34 formed in the front of the housing 10. As the clippings flow to the right in the chute 34 they encounter the ramp means 44. The ramp means 44 directs or channels the air and clippings downwardly toward the right blade 14. As the clippings continue flowing to the right beneath the ramp means 44 they will strike the vertically extending slide member 54 and be directed or channeled radially inwardly toward the inner portion 22 of the right blade 14. The slide member 54 redirects the flow of air away from the discharge outlet 32 and toward the inner portion 22 of the right blade 14. The ramp means 44 and slide member 54 form a channel that ends proximate the inner portion 22 of the right blade 14. As the clippings leave the ramp means 44 the inner portion 22 of the blade 14 re-cuts them, and the trailing downturned wing portion 26 directs the clippings downwardly toward the soil.

During mowing operation in areas of relatively short grass, the clippings will tend to flow within the housing 10 near the top wall 28 of the housing 10 due to the lifting force imparted by the upturned wing portion 20. As the clippings encounter the ramp means 44 and slide member 54 they remain pressed upwardly against the ramp means 44. Air flowing within the housing 10 will be intermingled with the clippings and will also be flowing beneath the clippings. Therefore, as the air and clippings are forced downwardly by the ramp means 44, the majority of the clippings are directed inwardly by the slide member 54. However, a portion of the air beneath the flowing clippings is allowed to flow rightwardly beneath the slide member 54 and out the discharge outlet 32. Since a portion of the air flows beneath the slide member 54, the circulation of air within the housing 10 is improved and the vacuum effect for lifting grass to be cut is enhanced. The partially opened discharge outlet 32 therefore improves the quality of cut during cutting operations in normal length grass.

The partially opened discharge outlet 32 also improves the quality of cut when operating in areas of thick or dense vegetation. When mulching in relatively long or thick grass the housing 10 will contain a larger amount of flowing clippings. However, the housing 10 will tend not to clog or deposit clumps of grass in windrows, as does the prior art devices. In the preferred embodiment, the partially opened discharge outlet 32 allows air to continually flow within the housing to provide a steady stream for moving the clippings. The preferred embodiment therefore reduces the amount of clumped grass that falls to the ground. Also, as the amount of flowing clippings increases, the ability of the inner portion 22 of the blade 14 to mulch the clippings decreases. Therefore, when operating in relatively long or dense grass the preferred embodiment provides an overflow function by allowing a portion of the clippings to flow rightwardly beneath the slide member 54. The inner portion 22 of the blade 14 is thereby prevented from receiving an excessive amount of clippings to mulch. A portion of the clippings that have flowed beneath the slide member 54 will contact the plate member 56 or adjustable member 60 and will be blocked from passing through the discharge outlet 32. These clippings continue to circulate within the housing 10 and will be guided toward the inner portion 22 of the blade 14 when they again encounter the ramp means 44 and slide member 54. The remainder of the clippings that flow beneath the slide member 54 will be discharged through the outlet 32 and onto the surface of the lawn. Only a small portion of the clippings are ejected from the discharge outlet 32 due to the overflow function of the preferred embodiment such that the appearance of the clippings on the top surface of the lawn will not be objectionable. The ramp means 44 and slide member 54 continue to direct a large portion of the air toward the inner portion 22 of the blade 14 to be chopped and deposited beneath the top surface of the lawn.

The adjustable member 60 provides a plurality of orifices or openings 62 that serve to allow air to pass therethrough during mulching operation. The openings 62 tend to become covered or plugged with grass during operation in grassy areas. When the openings 62 are covered or plugged with grass, the only path the air and clippings can take through the discharge outlet 32 is beneath the adjustable member 60. Therefore, the adjustable member 60 tends to act as a continuous solid surface when the openings 62 are covered with grass during operation in grassy areas. However, the openings 62 are particularly useful when mulching leaves, since dry leaves will shatter and crumble as they are forced through the openings 62. Therefore, the operator can fix the adjustable member 60 in a lowered position to accommodate the mulching of leaves or the cutting and mulching of relatively short grass. When the adjustable member 62 is in a raised position, the passage of air through the discharge outlet 32 is increased and the uplifting and circulation of clippings is improved. Accordingly, the operator can raise the adjustable member 60 when relatively great circulation and uplifting are desirable, such as when relatively long, heavy or wet grass is to be cut and mulched.

The ramp means 44 as illustrated in FIGS. 2, 5, 6 and 7 discloses an inclined surface that receives the air flow and clippings and directs them into the slide member 54. The ramp means 44 could also be constructed to include a surface that would be inclined inwardly such that it would assist the slide member 54 in directing air and clippings toward the blade's axis of rotation.

The preferred embodiment of the present invention is described herein for use with a mower deck having a plurality of cutter blades. However, the present invention may also be utilized with a variety of sizes of mower decks having single or multiple cutter blades. In addition, the preferred embodiment describes the ramp means 44 and slide member 54 as positioned between the discharge outlet 32 and the blade 14. The ramp means 44 and slide member 54 may be positioned at a location within the housing 10 other than between the discharge outlet 32 and a blade 14. However, the efficiency of the mulching operation and the quality of cut may be hindered when the ramp means 44 and slide member 54 are not positioned between the discharge outlet 32 and the blade 14.

Figure 8:
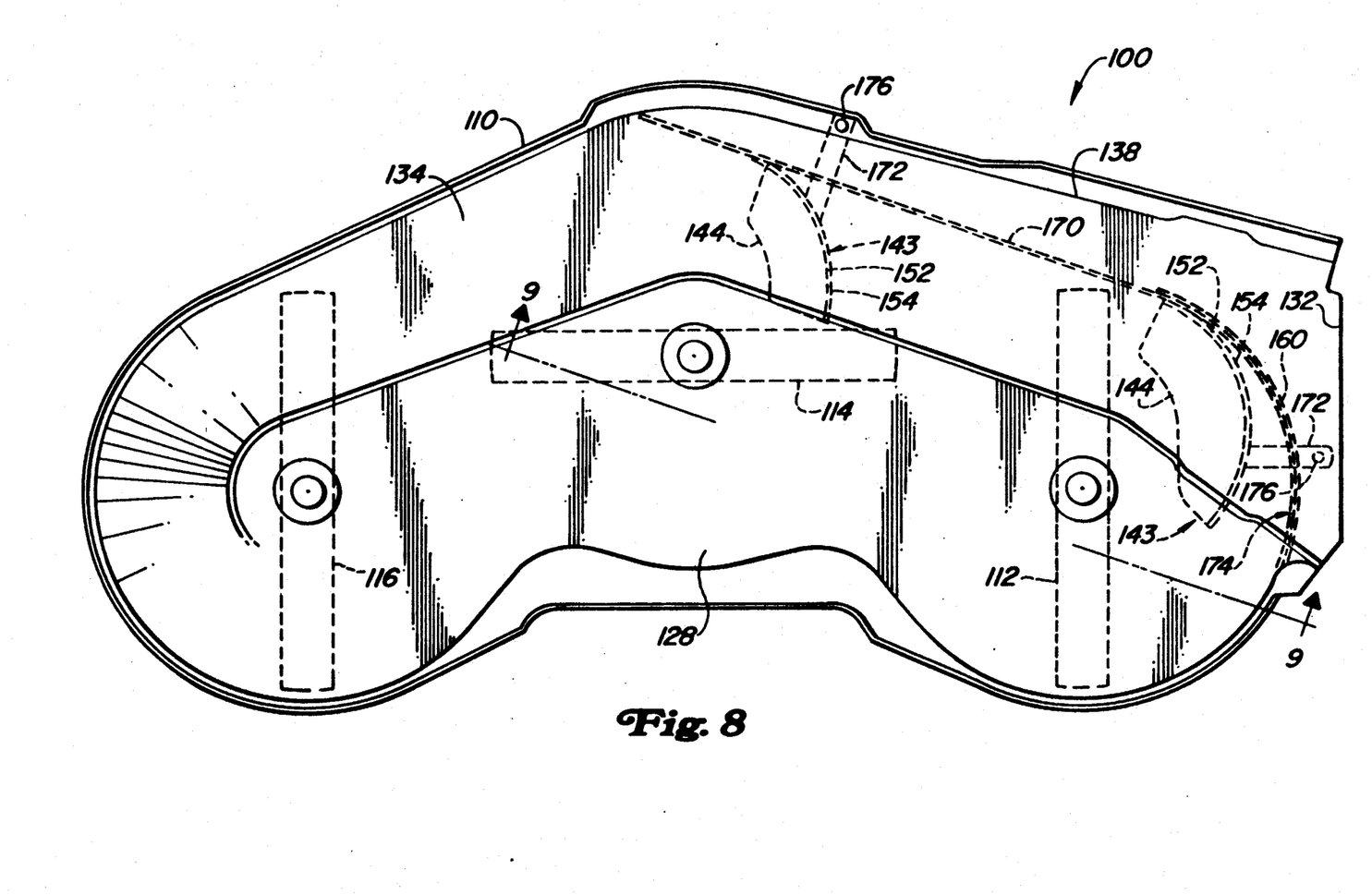
FIG. 8 is a plan view of an alternate embodiment of the present invention.

Referring now to FIG. 8, there is shown a plan view of an alternate embodiment 100 of the present invention. A multiple spindle housing 110 is shown having three mower blades 112, 114 and 116. The housing 110 includes a generally vertical front wall 138, and a discharge outlet 132 formed at the right-hand portion of the housing. A pair of guide means 143 are provided which are positioned adjacent or directly over the mower blades 112 and 114 positioned closest to the discharge outlet, i.e. the right-hand and middle blades 112 and 114. The structure and function of the guide means 143 is generally similar to that described in the preferred embodiment above. Each guide means 143 includes an arcuate ramp 144 which extends inwardly in the direction of blade rotation toward the rotational axis of the respective blade 112, 114. A generally vertically extending slide member 154 is coupled to the outer radial edge 152 of each ramp means 144. The blades 112, 114 and 116 are of the mulching type and include outer cutting portions and inner mulching portions as described in the preferred embodiment above. The guide means 143 act to channel flowing clippings into the inner mulching portion of the respective blades 112 and 114, where they will be recut and directed downwardly into the growing vegetation.

The alternate embodiment 100 includes a connecting wall 170 that extends between and is welded to or otherwise coupled with the two guide means 143. The connecting wall 170 is positioned between the rotational axes of the blades 112, 114 and the front wall 138. When installed, the connecting member 170 extends downwardly from the top wall 128 of the housing 110 to about the height of the blades 112 and 114, and is preferably positioned slightly higher than the outer edges of the blades 112 and 114. Attachment brackets 172 are fixed or welded to the guide means 143 and connecting wall 170 and are bolted or otherwise fixed to the housing 110 for securing the mechanism in place for operation. A portion 174 of the connecting wall 170 extends to the right in FIG. 8 to cover or block a portion of the discharge outlet 132. An adjustable member 160, as shown in FIG. 9, is generally positioned within the discharge outlet 132 and is bolted to the connecting wall 170 for further blocking a portion of the air from exiting the housing 110 via the outlet 132.

The alternate embodiment 100 is adapted for use with a mower housing 110 that defines a large chute 134. Since the front wall 138 of the housing 110 shown in FIG. 8 is positioned a substantial distance in front of the right-hand and middle blades 112 and 114, the chute 134 formed by the housing 110 is relatively large. Large chutes have large capacities and are therefore advantageous when a high volume of cut grass must be conducted through the discharge outlet during non-mulching mowing operations. The connecting wall 170 according to the alternate embodiment 100 acts as a false front wall that is closer to or adjacent the edges of the blades 112, 114. The connecting wall 170 thereby effectively shifts the path of travel of flowing clippings and air closer to or directly adjacent the blade edges. The distance that the clippings must be channeled by the guide means 143 toward the inner mulching portion of the blades 112, and 114 is correspondingly decreased. The mulching operation is therefore more effective. The connecting wall 170 also acts to reduce the effective volume of the housing 110. Since the volume of space within which the clippings flow is reduced, the velocity of mowed clippings increases. The flowing clippings and air are thereby directed toward the respective guide means 143 more easily and without a great loss of energy. More clippings reach the inner mulch portion of the blades 112 and 114, which results in enhanced mulching operation.

The installation of the alternate embodiment 100 is made simple by its one-piece design. The mechanism is slid into place beneath the deck, and bolts 176 are attached to secure the mechanism in place. The bolts 176 can be inserted and tightened from above and outside the housing 110, thereby further simplifying the attachment process.

Figure 9:
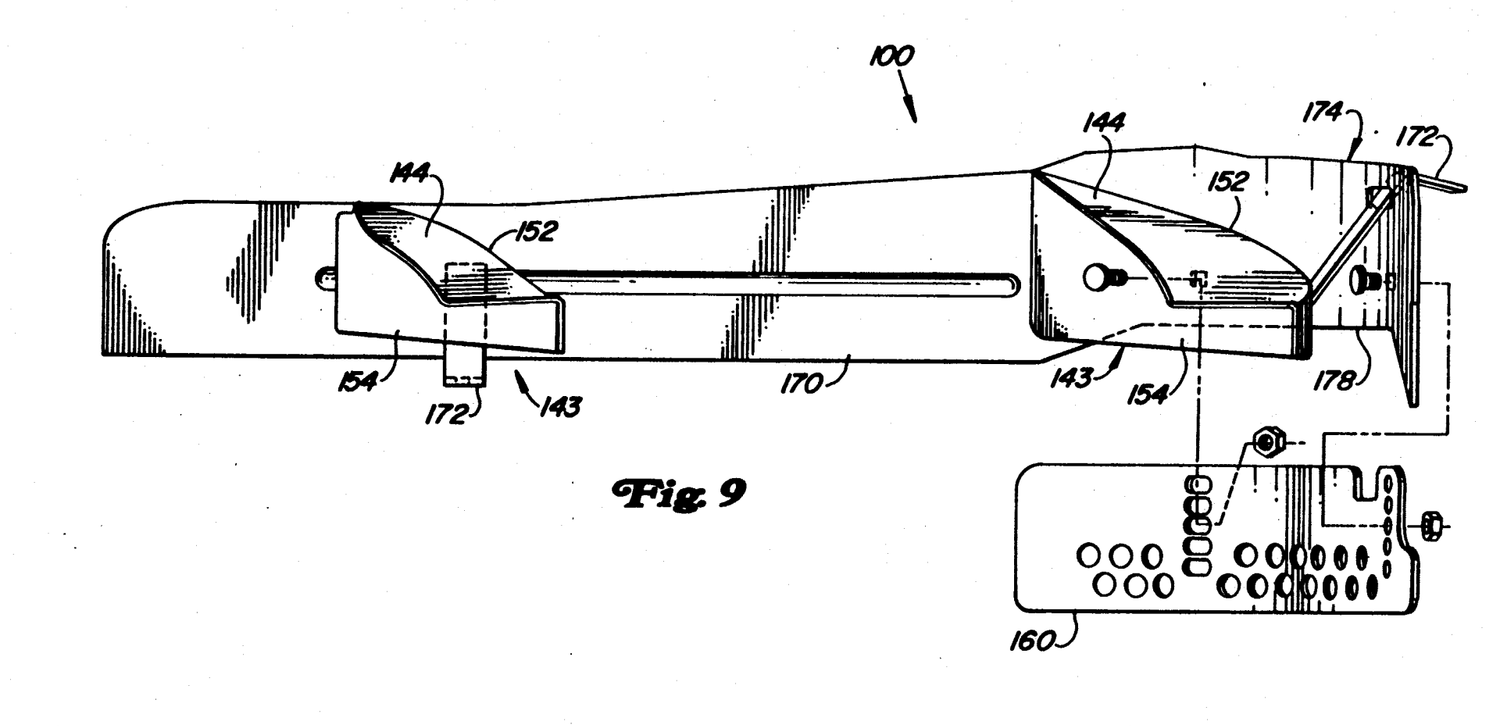
FIG. 9 is an exploded partial view from the rear of the alternate embodiment as shown in FIG. 8.

FIG. 9 is a rear view of the alternate embodiment 100 removed from the mower housing 110 and showing the adjustable member 160 detached from the connecting member 170. The connecting member 170 defines an arched portion 178 beneath which grass clippings may pass to enter the housing's discharge outlet 132. The adjustable member 160 is selectively shiftable vertically to cover a portion of the arched opening for varying the restriction of clippings flowing beneath the arched portion 178. The arched portion 178 and adjustable member 160 of the alternate embodiment thereby function similarly to the plate member 56 and adjustable member 60 of the preferred embodiment as described above.

I claim:

1. A mulching apparatus for use in a mower having a housing including a horizontally extending top wall and generally vertically extending side walls, a discharge outlet and a blade rotatable about an axis of rotation in a generally horizontal plane within the housing for cutting vegetation and for creating a circular path of air within the housing, said apparatus comprising:
   a guide means coupled with the housing for guiding air and vegetation clippings radially inwardly and downwardly towards the blade for re-cutting of the vegetation; and
   blocking means coupled with the housing for partially blocking a portion of the air and clippings from being discharged through the discharge outlet, said blocking means allowing a portion of the air to be discharged through the discharge outlet.

2. The invention of claim 1, wherein the blocking means further comprises a plate member that extends downwardly over the top portion of the discharge outlet for preventing air and clippings from passing through the top portion of the discharge outlet, said plate having a lower edge beneath which a portion of the clippings and air within the housing may pass through the discharge outlet.

3. A mulching apparatus for use in a mower having a housing including a discharge outlet and a horizontally extending top wall, a generally vertically extending side wall, and a blade rotatable about an axis of rotation in a generally horizontal plane within the housing for cutting vegetation and for creating a circular path of air within the housing, said apparatus comprising:
   an arcuate ramp means coupled with the housing and positioned between the top wall of the housing and the blade, said ramp means being positioned generally between the axis of rotation of the blade and the discharge outlet, said ramp means sloping downwardly toward the blade in the direction of blade rotation for channeling the air and vegetation clippings within the housing downwardly towards the rotating blade, said ramp means having an outer radial edge portion extending generally in an arc, said outer radial edge portion extending radially inwardly toward the axis of rotation of the blade in the direction of blade rotation;
   a generally vertically extending slide member extending downwardly from the outer radial edge of the ramp means for channeling air and clippings within the housing away from the discharge outlet and inwardly toward the axis of rotation of the blade; and
   blocking means for partially blocking the discharge of air and clippings through the discharge opening.

4. The invention of claim 3, wherein the slide member extends downwardly from the outer radial edge of the ramp means a decreasing amount in the direction of rotation of the blade.

5. The invention of claim 4, wherein the generally vertical slide member extends downwardly from the ramp means to channel vegetation clippings inwardly toward the axis of rotation of the blade, and to allow grass clippings to pass over the vertical slide member and be discharged through the discharge outlet when the density of the clippings within the housing increases.

6. The invention of claim 4, wherein the blocking means further comprises a plate extending over a portion of the discharge opening.

7. The invention of claim 4, wherein the blocking means further comprises:
   a plate extending over a portion of the discharge opening; and
   a member coupled with the plate and having a plurality of openings through which air may pass to exit the discharge opening, said member being adjustable to a plurality of positions for varying blockage of the discharge opening.

8. The invention of claim 1, wherein the guide means is positioned between the axis of rotation of the blade and the blocking means.

9. The invention of claim 3, wherein the guide means is positioned between the axis of rotation of the blade and the blocking means.

10. The invention of claim 4, wherein the slide member is positioned generally between the axis of rotation of the blade and the blocking means.

11. The invention of claim 7, wherein said plate includes a lower edge beneath which a portion of the clippings and air within the housing may pass through the discharge outlet.

12. The invention of claim 8, wherein said plate includes a lower edge beneath which a portion of the clippings and air within the housing may pass through the discharge outlet.

13. The invention of claim 1, wherein the blade includes an outer portion spaced radially from the axis of rotation and having a leading cutting edge and a trailing upturned portion for forcing air and vegetation clippings upwardly within the housing, said blade also having an inner mulching portion spaced between the axis of rotation and the outer portion, said inner portion having a leading cutting edge for re-cutting vegetation clippings, said inner portion having a trailing edge downturned with respect to the inner portion's leading cutting edge for forcing air and re-cut vegetation clippings downwardly within the housing, and said guide means extends to a position directly adjacent the inner portion of the blade for guiding air and vegetation clippings radially inwardly and downwardly toward the inner portion of the blade.

14. The invention of claim 13, wherein said guide means extends inwardly from the side walls and downwardly from the top wall to a position directly above the inner portion of the blade for channeling vegetation clippings for re-cutting by the inner portion of the blade.

15. The invention of claim 4, wherein the blade includes an outer portion spaced radially from the axis of rotation and having a leading cutting edge and a trailing upturned portion for forcing air and vegetation clippings upwardly within the housing, said blade also having an inner mulching portion spaced between the axis of rotation and the outer portion, said inner portion having a leading cutting edge for re-cutting vegetation clippings, said inner portion having a tailing edge downturned with respect to the inner portion's leading cutting edge for forcing air and re-cut vegetation clippings downwardly within the housing;

said ramp means extending inwardly from the side wall in the direction of blade rotation and to a position directly adjacent the inner portion of the blade for channeling air and vegetation clippings inwardly for re-cutting by the inner portion of the blade; and said slide member extends downwardly in the direction of blade rotation and to a position directly adjacent the inner portion of the blade for channeling air and vegetation clippings for re-cutting by the inner portion of the blade.

16. The invention of claim 15, wherein said ramp means and said slide member extend downwardly and inwardly, respectively, to positions directly above the inner portion of the blade for channeling vegetation clippings for re-cutting by the inner portion of the blade.

17. The invention of claim 3, wherein the generally vertically extending slide member is positioned against the generally vertically extending side wall and extends in the direction of blade rotation inwardly toward the blade's axis of rotation, a space being thereby defined between the slide member and the blocking means.

18. The invention of claim 17, wherein a portion of the air which strikes the slide member is allowed to pass beneath the slide member and travel through the space defined between the slide member and the blocking means.

19. The invention of claim 18, wherein at least a portion of the air that has passed beneath the slide member strikes the blocking means, said blocking means preventing a portion of said air from passing through the discharge outlet, and said blocking means allowing a portion of said air to exit the housing through the discharge outlet.

20. A mulching apparatus for use in a mower having a housing including a horizontally extending top wall and generally vertically extending side walls, a discharge outlet having a top portion, and a blade rotatable about an axis of rotation in a generally horizontal plane within the housing for cutting vegetation and for creating a circular path of air within the housing, said apparatus comprising:

a guide means coupled with the housing for guiding air and vegetation clippings radially inwardly and downwardly towards the blade for re-cutting of the vegetation;

blocking means coupled with the housing for selectively partially blocking a portion of the air and clippings from being discharged through the discharge outlet, said blocking means allowing a portion of the air to be discharged through the discharge outlet, wherein said blocking means further comprises a plate member that extends downwardly over the top portion of the discharge outlet for preventing air and clippings from passing through the top portion of the discharge outlet, said plate having a lower edge beneath which a portion of the clippings and air within the housing may pass through the discharge outlet.

21. A mulching apparatus for use in a mower having a housing including a discharge outlet and a horizontally extending top wall, a generally vertically extending side wall, and a blade rotatable about an axis of rotation in a generally horizontal plane within the housing for cutting vegetation and for creating a circular path of air within the housing, said apparatus comprising:

ramp means coupled with the housing and positioned between the top wall of the housing and the blade, said ramp means being positioned generally between the axis of rotation of the blade and the discharge outlet, said ramp means extending downwardly toward the blade in the direction of blade rotation for channeling the air and vegetation clippings within the housing downwardly towards the rotating blade, said ramp means having an outer radial edge portion extending radially inwardly toward the axis of rotation of the blade in the direction of blade rotation;

a generally vertically extending slide member extending downwardly from the outer radial edge of the ramp means and inwardly toward the axis of rotation of the blade for channeling air and clippings within the housing away from the discharge outlet, said slide member including a lower edge beneath which a portion of the air within the housing may pass;

blocking means positioned within the discharge outlet for being struck by at least a portion of the air that has passed beneath the lower edge of the slide member, said blocking means preventing a portion of said air from passing through the discharge outlet and allowing a portion of said air to exit through the discharge outlet 22. The invention of claim 21, wherein the blade includes an outer portion spaced radially from the axis of rotation and having a leading cutting edge and a trailing upturned portion for forcing air and vegetation clippings upwardly within the housing, said blade also having an inner mulching portion spaced between the axis of rotation and the outer portion, said inner portion having a leading cutting edge for re-cutting vegetation clippings, said inner portion having a trailing edge downturned with respect to the inner portion's leading cutting edge for forcing air and re-cut vegetation clippings downwardly within, the housing.

23. The invention of claim 22, wherein said ramp means and said slide member extend downwardly and inwardly, respectively, to positions directly adjacent the inner portion of the blade for channeling vegetation clippings for re-cutting by the inner portion of the blade.

24. The invention of claim 1, wherein a plurality of blades are provided for rotation within the housing, said housing including a front wall spaced a substantial distance forwardly from at least one of the blades; and two of said guide means being provided adjacent the two respective blades that are closest to the discharge outlet, each of said guide means being coupled with a generally vertically extending connecting wall which is positioned between the front wall and the two blades closest the discharge outlet and in spaced relation to the front wall for directing the path of air to a location substantially adjacent the two blades closest the discharge outlet.

25. The invention of claim 24, wherein the guide means adjacent the blade closest the discharge outlet is positioned between said blade's axis of rotation and the blocking means.

26. The invention of claim 24, wherein each guide means includes an arcuate ramp means positioned between the top wall of the housing and a respective blade'said ramp means sloping downwardly toward the blade in the direction of blade rotation for channeling air and vegetation clippings within the housing downwardly towards the respective rotating blade, said ramp means having an outer radial edge portion extending generally in an arc, said outer radial edge portion extending radially inwardly toward the axis of rotation of the respective blade in the direction of blade rotation;

a generally vertically extending slide member extending downwardly from the outer radial edge of the ramp means for channeling air and clippings within the housing away from the discharge outlet and inwardly toward the axis of rotation of the respective blade; and the guide means positioned adjacent the blade closest to the discharge outlet is positioned generally between the axis of rotation of said blade and the discharge outlet.

27. The invention of claim 26, wherein the generally vertically extending slide member is positioned against the connecting wall and extends in the direction of blade rotation inwardly toward the blade's axis of rotation, a space being thereby defined between the slide member and the blocking means.

28. The invention of claim 27, wherein the guide means adjacent the blade closest the discharge outlet is positioned between said blade's axis of rotation and the blocking means.

29. The invention of claim 26, wherein at least one blade includes an outer portion spaced radially from the axis of rotation and having a leading cutting edge and a trailing upturned portion for forcing air and vegetation clippings upwardly within the housing, said blade also having an inner mulching portion spaced between the axis of rotation and the outer portion, said inner portion having a leading cutting edge for re-cutting vegetation clippings, said inner portion having a trailing edge downturned with respect to the inner portion's leading cutting edge for forcing air and re-cut vegetation clippings downwardly within the housing, and said guide means extends to a position directly adjacent the inner portion of the blade for guiding air and vegetation clippings radially inward and downwardly toward the inner portion of the blade.

30. The invention of claim 29, wherein the blocking means comprises a portion of the connecting wall which extends across a portion of the discharge outlet for blocking a portion of the air from exiting the housing through the discharge outlet.

31. The invention or claim 30, wherein the blocking means further comprises:

a member coupled with the connecting wall and positioned within the discharge outlet, said member having a plurality of openings through which air may pass to exit the discharge opening, said member being adjustable to a plurality of positions for varying blockage of the discharge opening.

32. A mulching apparatus for use in a mower having a housing which includes a horizontally extending top wall, generally vertically extending side walls, and a generally vertically extending front wall, a discharge outlet having a top portion, a plurality of blades being rotatable about respective generally vertical axes of rotation within the housing for cutting vegetation and for creating a path of air within the housing, said apparatus comprising:

guide means positioned above respective mower blades for guiding air and vegetation clippings radially inwardly and downwardly towards the blade for re-cutting of the vegetation;

blocking means coupled with the housing for partially blocking a portion of the air and clippings from being discharged through the discharge outlet, said blocking means allowing a portion of the air to be discharged through the discharge outlet;

a generally vertically extending connecting wall to which the respective guide means are fixed, said connecting wall being positioned between the front wall and at least one mower blade and in spaced relation to the front wall for directing the path of air within the housing to a position substantially adjacent a blade and guide means.

33. The invention of claim 32, wherein the blocking means comprises a portion of the connecting wall which extends across a portion of the discharge outlet for blocking a portion of the air from exiting the housing through the discharge outlet.

34. The invention of claim 33, wherein the generally vertically extending slide member is positioned against the connecting wall and extends in the direction of blade rotation inwardly toward the blade's axis of rotation, a space being thereby defined between the slide member and the blocking means.

35. The invention of claim 34, wherein the blocking means further comprises.

a member coupled with the connecting wall and positioned within the discharge outlet, said member having a plurality of openings through which air may pass to exit the discharge opening, said member being adjustable to a plurality of positions for varying blockage of the discharge opening.

* * * * *